United States Patent [19]

Ohodaira et al.

[11] Patent Number: 4,482,585
[45] Date of Patent: Nov. 13, 1984

[54] CONTAINER RESISTANT TO EXTREMELY LOW TEMPERATURES

[75] Inventors: Takeo Ohodaira, Funabashi; Takashi Mizutani, Tokyo, both of Japan

[73] Assignee: Toppan Printing Co., Ltd., Japan

[21] Appl. No.: 387,359

[22] Filed: Jun. 11, 1982

[51] Int. Cl.³ ............................................. B65D 33/16
[52] U.S. Cl. ..................... 428/35; 604/262; 604/408; 604/409; 604/410
[58] Field of Search ............... 604/408, 409, 410, 262; 428/35

[56] References Cited

U.S. PATENT DOCUMENTS

| | | | |
|---|---|---|---|
| 3,576,650 | 4/1971 | Underwood et al. | 99/171 |
| 3,642,047 | 2/1972 | Waage | 604/408 |
| 3,942,529 | 3/1976 | Waage | 604/410 |
| 4,105,118 | 8/1978 | Williams, Jr. et al. | 428/420 |
| 4,131,200 | 12/1978 | Rinfret | 604/408 |
| 4,212,299 | 7/1980 | Yokokoji et al. | 604/408 |
| 4,265,949 | 5/1981 | Kugimiga | 428/35 |

FOREIGN PATENT DOCUMENTS

| | | |
|---|---|---|
| 49-8079 | 2/1974 | Japan . |
| 1162461 | 8/1969 | United Kingdom . |
| 2001006 | 1/1979 | United Kingdom . |

*Primary Examiner*—John E. Kittle
*Attorney, Agent, or Firm*—Lerner, David, Littenberg, Krumholz & Mentlik

[57] ABSTRACT

A container for freezing or preserving physiological saline solutions for medical use is disclosed which is resistant to extremely low temperatures and which comprises laminated sheets. Each laminated sheet comprises an inner layer of unstretched film of polyethylene having a viscometric average molecular weight of 1,000,000 or more and a light-scattering average molecular weight of 3,000,000 or more; and an outer layer of polyethylene terephthalate or the like.

7 Claims, 4 Drawing Figures (a)

(b)

(c)

CONTAINER RESISTANT TO EXTREMELY LOW TEMPERATURES

BACKGROUND OF THE INVENTION

1. Field of the Invention

The present invention relates to a container resistant to extremely low temperatures such as about −196° C. which is the temperature of liquid nitrogen and, more particularly, to a plastic container resistant to extremely low temperatures which is suitable for freezing preservation of food, chemicals or physiological saline solutions such as bacteria, enzymes, and blood components such as erythrocytes, blood platelets, and plasma.

2. Description of the Prior Art

Conventional methods for preserving blood include the ACD blood preservation method utilizing an ACD anticoagulant (blood or blood components are preserved in glass bottles or soft vinyl chloride containers holding an ACD solution); the slow freezing method (blood or blood components are preserved in soft vinyl chloride containers at −80° to −85° C.); or the like. However, according to the former method, blood can only be preserved for 21 days from the blood collection due to the blood metabolism during the preservation. According to the latter method, since high concentration glycerol is used as an additive for preventing the adverse effects of freezing preservation, the blood must be rinsed off. Therefore, the rate of recovery of erythrocytes becomes low, and the quality of erythrocytes is degraded in several years of preservation. Accordingly, both these methods are not suitable for preserving blood over a long period of time.

In order to solve these problems, the quick freezing method has been proposed. In the quick freezing method, a physiological saline solution such as blood components is instantaneously frozen at an extremely low temperature of −150° to −200° C. This method requires a container for holding blood which withstands extremely low temperatures, which is resistant to sterilization, and which is easy to handle. However, a soft vinyl chloride container conventionally used for blood preservation cannot withstand extremely low temperatures such as −196° C. of liquid nitrogen and easily cracks under even a small impact after being frozen. Sealing of inlet or outlet ports of containers of a metal such as aluminum and stainless steel is difficult, so that liquid nitrogen frequently penetrates into the containers. These metal containers are non-transparet and do not allow observation of the contents through the container walls before use and are expensive to manufacture.

Fluorine-contained resins and polyimide are known as high polymers which are highly resistant to extremely high and low temperatures. It has been proposed to use, for freezing preservation of blood, a container bag comprising a laminated body of an inner layer of a tetrafluoroethylene-hexafluoropropylene copolymer, and an outer layer of polybromelliteimide. Of these materials, polyimide has a very high melting point and hence excellent heat resistance, and also has high resistance to extremely low temperatures such that it has flexibility at the temperature of liquid helium (4° K.). Although polyimide is transparent, it is dark brown in color and may not allow observation through the container wall depending upon the type of the contents. Polyimide is also one of the high polymers which have low thermal conductivity. This leads to a slow freezing speed which adversely affects the recovery rate or quality of the contents, or also requires strict heat-sealing conditions which results in imcomplete sealing or other problems. Polyimide, above all, is highly expensive.

U.S. Pat. No. 3,576,650 discloses a container for use at extremely low temperatures which uses a biaxially oriented polyolefin film. However, upon heat sealing, the sealed part and the surrounding part return to the state before stretching. Therefore, the sealed part must be protected by a metal net or the like in order to eliminate the shocks against the sealed part. Furthermore, general high-density polyethylene (maximum molecular weight of 500,000) is resistant to low temperatures of up to −100° C. and cannot withstand a low temperature of −196° C.

BRIEF SUMMARY OF THE INVENTION

The present invention has been made in consideration of the above and has for its object to provide a container resistant to extremely low temperatures, which allows sterilization with ethylene oxide gas or autoclave sterilization, which can withstand use at extremely low temperatures of about −200° C., which can withstand rapid temperature ranges during quick freezing or thawing, which is easy to manufacture, which is simple in construction, which has an inert inner surface non-toxic to the physiological saline solution held therein, which allows easy observation of the contents, and which is relatively inexpensive.

In order to achieve the above object, there is provided according to the present invention a container resistant to extremely low temperatures, comprising a laminated body of an inner layer and an outer layer, the inner layer comprising a non-stretched film of a polyethylene which is prepared by the low polymerization method and which has a viscometric average molecular weight of 1,000,000 or more and a light-scattering average molecular weight of 3,000,000 or more, and the outer layer comprising a member selected from the group consisting of biaxially stretched polyethylene terephthalate, stretched or non-stretched polyethylene naphthalate, polyparabanic acid resin, perfluoroalkoxy resin, polytetrafluoroethylene, ethylene-tetrafluoroethylene copolymer, tetrafluoroethylenehexafluoropropylene copolymer, chlorinated trifluoroethylene resin, and aromatic polyimide resin.

BRIEF DESCRIPTION OF THE DRAWINGS

The accompanying drawings show an embodiment of the present invention in which.

DETAILED DESCRIPTION OF THE PREFERRED EMBODIMENT

Figure 1:
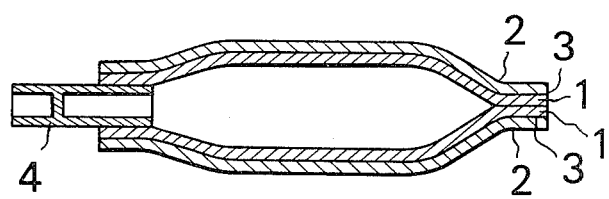
FIG. 1 is a sectional view of a container bag.

A viscometric average molecular weight of 1,000,000 or more and a light-scattering average molecular weight of 3,000,000 or more of the ultra-high-molecular weight, non-stretched polyethylene prepared by the low polymerization method render the inner layer the resistance to extremely low temperatures. Since non-streched polyethylene generally has an extremely high solution viscosity, it is generally used in the form of a film having a thickness of 0.025 to 0.125 mm which is prepared by molding a powder of non-stretched polyethylene by pressing or ramextrusion and cutting into the film by planing. Due to its ultra-high-molecular weight, this film has a high impact strength; it has a constant flexibility and excellent physical properties at −196° C. Since the solution viscosity is high, the inner surfaces of the container may not adhere together by autoclave sterilization at 121° C. for 30 minutes. Furthermore, the film allows heat sealing at temperatures higher than that of high-density polyethylene by 30 to 50° C. Since the polyethylene is inert and causes almost no low molecular substance elution, it is chemically stable and does not adversely affect contents such as erythrocytes during preservation over a long period of time. Since non-stretched polyethylene is used, it does not cause the problem of imcomplete seal with a conventional polyethylene container of low molecular weight which is highly stretched for resitance to low temperatures. Therefore, the container of the present invention may not cause cracking at low temperatures.

The inner layer of polyethylene described above may be used for manufacturing a single-layered container bag. However, the obtained container bag may not have sufficent seal strength upon heat sealing, since the sealed portion may become thinner and is subject to tear. Furthermore, since the film adheres to the seal bar during heat sealing, stable heat-sealing operation may not be performed. Despite its ultra-high-molecular weight, the film has a flexibility inherent to polyethylene. In order to allow handling under extreme low temperatures or centrifugation during thawing of erythrocytes, the inner layer is conveniently covered with an outer layer.

The resin of the outer layer must have a melting point and a heat-sealing point higher than those of polyethylene of the inner layer. At the same time, the resin of the outer layer must have physical properties, at extreme low temperatures such as −196° C., which are the same or equivalent to those at room temperature. Examples of such a resin include biaxially stretched polyethylene terephthalate, stretched or non-stretched polyethylene naphthalate, polyparabanic acid resin, perfluoroalkoxy resin, polytetrafluoroethylene, ethylene-tetrafluoroethylene copolymer, tetrafluoroethylene-hexafluoropropylene copolymer, chlorinated trifluoroethylene resin, and aromatic polyimide resin. A film of 0.012 to 0.075 mm thickness of a resin selected from these examples is used.

The inner and outer layer as described above are adhered with an adhesive; the adhesive must have resistance to extremely low temperatures and resistance to sterilization. Examples of such an adhesive include those reaction-curing adhesives of polyester, polyurethane, and epoxy type which have the optimum resistance to extremely high and low temperatures. In order to improve adhesion between the inner and outer layers, it is convenient to treat the surfaces of these layers by the known method which include the corona discharge treatment, plasma treatment, and various types of chemical treatments.

In view of the adhesion strength and prevention of pinholes, the lower limit of the thickness of the inner layer of the present invention is preferably 0.025 mm. In order to facilitate quick thawing, the upper limit of the thickness of the inner layer is preferably 0.125 mm. Meanwhile, the outer layer preferably has a thickness within the range of 0.012 to 0.075 mm. From the viewpoints of stability, strength, and thermal conductivity of the sealed portion of the container, it is preferable that the inner layer of polyethylene be relatively thick, the outer layer be relatively thin, and the overall thickness of the laminated sheet be within the range of 0.15 to 0.125 mm.

Figure 2:
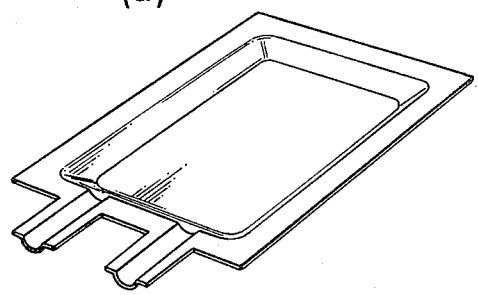
FIG. 2A is a perspective view of a laminated sheet formed by pressure forming.
FIG. 2B is a plan view of a container obtained by heat-sealing two sheets as in FIG. 2A.
FIG. 2C is a sectional view of the container shown in FIG. 2B.
Figure 2:
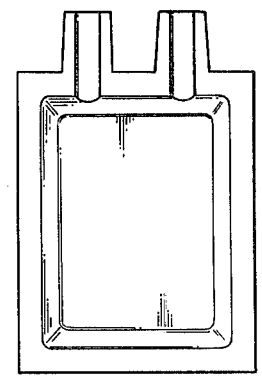
Figure 2:
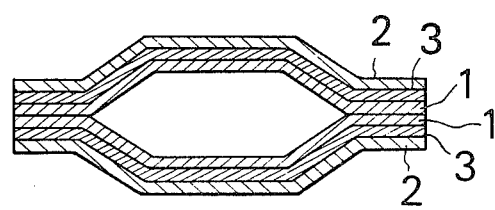

The manner according to which a container bag is prepared from this laminated sheet will be described with reference to FIG. 1. Referring to FIG. 1, two laminated sheets are superposed on top of each other with polyethylene films 1 (inner layers) facing inward. Liquid inlet and outlet ports 4 of ultra-high-molecular weight polyethylene according to the present invention are sandwiched between the laminate sheets at one side of the stacked sheets. The periphery of the stacked sheets is then heat-sealed to provide a container bag. If films 3 of ethylene-tetrafluoroethylene copolymer are used as the outer layers, a similar container may be prepared without requiring the liquid inlet and outlet ports 4. In this case, as shown in FIGS. 2A to 2 C., the laminated sheet is subjected to shallow drawing of about 10 mm by vacuum forming or pressure forming while simultaneously forming halves of liquid inlet and outlet ports. Two laminated sheets thus formed are superposed on top of each other with their polyethylene films facing inward. The periphery of the stacked sheets is then heat-sealed to provide a container. The container thus obtained is used for preservation of blood or the like after being sterilized by steam sterilization or ethylene oxide gas (EOG) sterilization.

The present invention will now be described by way of its examples.

EXAMPLE 1

A film of ultra-high-molecular weight polyethylene (Hostalen GUR available from Hechist Inc.; about $3.5 \times 1,000,000$ light scattering average molecular weight) and of 0.098 mm thickness was prepared with its one surface treated for good adhesion. Another film of perfluoroalkoxy resin (Teflon PFA-CLP available from Du Pont de Nemours) and of 0.025 mm thickness was prepared with its one surface coated with a polyester isocyanate-type adhesive at a rate of 3.8 g/m². These two films were adhered together with their surfaces treated for adhesion facing inward to provide a laminated sheet. The laminated sheet was then pressure formed with the polyethylene film facing inward by tray-shaped molds having flanges corresponding to sealing part of the container and semicylindrical parts corresponding to the liquid inlet and outlet ports. Two tray-shaped laminated sheets thus obtained were opposed to each other and were heat-sealed to provide a container of 400 ml capacity. After filling the container with 380 ml of physiological saline solution, the liquid inlet and outlet ports formed at the sealing part were heat-sealed. Thereafter, the container was sterilized by high-pressure steam sterilization at 121° C. for 60 minutes. After cooling the container to room temperature, it was vertically immersed in a liquid nitrogen tank for instantaneous freezing. Freezing was completed within about 2 minutes. The contents in the container were then thawed in warm water at 40° C. The freezing-thawing cycle as described above was repeated three times. However, no film separation, damage to container or leakage of the contents was observed.

EXAMPLE 2

A film of an ultra-high-molecular weight polyethylene terephthalate (HI-ZEX MILLION 240M available from Mitsui Petrochemical Industries, Ltd.; $3.0 \times 1,000,000$ light scattering average molecular weight) and of 0.100 mm thickness was prepared with its one surface treated for adhesion. Another film of biaxially stretched polyethylene terephthalate (LUMIRROR-P-11 available from Toray Industries, Inc.) and of 0.012 mm thickness was prepared with its one surface coated with a polyester isocyanate-type adhesive at a rate of $4.1$ g/m$^2$. These films were adhered together with their surfaces treated for adhesion facing inward to provide a laminated sheet. Three sides of two laminated sheets thus obtained were heat-sealed to provide a container of 170 mm width and 380 mm length. Liquid inlet and outlet ports of tube shape were formed at one unsealed side of the container with the liquid outlet port sealed, thus completing the container of 400 ml capacity. After EOG sterilization, the container was filled with a mixture of 400 ml of concentrated erythrycyte solution and 96% glycerin solution. The container was vertically immersed in a liquid nitrogen tank for instantaneous freezing while controlling the thickness of the container to be 20 mm. Freezing was completed within about 2 minutes. After storage at $-150°$ C. for two days, the contents in the container were thawed in warm water by shaking the container.

In the freezing-thawing cycle, no damage to the container was observed. Expansion of the container due to vaporization of liquid nitrogen during thawing, which is caused if the container has pin holes, was not observed.

When the containers prepared in Examples 1 and 2 above were subjected to acute toxicity test, elution test, heat-generating substance test, and microorganism permeation test according to the conventional methods, no abnormality was observed.

In summary, a container resistant to extremely low temperatures of the present invention is excellent in heat-sealability, easy to manufacture, is resistant to high-pressure steam sterilization or EOG sterilization, has sufficient flexibility and mechanical strength at extremely low temperatures such as $-196°$ C., and is non-toxic. Moreover, the container of the present invention is less expensive than conventional containers of FEP/polyimide laminated body, facilitates forming into the ampoule form, and is thus suitable for preservation of physiological saline solutions at low temperatures.

What is claimed is:

1. A container resistant to extremely low temperatures, comprising a laminated body comprising an inner layer and an outer layer adhesively bonded together, the inner layer comprising a non-stretched film of a polyethylene which is prepared by the low polymerization method and which has a viscometric average molecular wreight of not less than 1,000,000 and a light-scattering average molecular weight of not less than 3,000,000, and the outer layer comprising a member selected from the group consisting of biaxially stretched polyethylene terephthalate, stretched or non-stretched polyethylene naphthalate, polyparabanic acid resin, perfluoroalkoxy resin, polytetrafluoroethylene, ethylene-tetrafluoroethyene copolymer, chlorinated trifluoroethylene resin, and aromatic polyimide resin.

2. A container according to claim 1, wherein the inner layer comprises a film having a thickness of 0.025 to 0.125 mm.

3. A container according to claim 2, wherein the outer layer comprises a film having a thickness of 0.012 to 0.075 mm.

4. A container according to any one of claims 1 to 3, wherein the inner layers of two of the laminated bodies are heat-sealed at peripheries thereof.

5. A container according to claim 1, wherein the adhesive is a member selected from the group consisting of polyester-type, polyurethane-type and epoxy-type adhesives.

6. A container according to any one of claims 1 to 3, wherein the container has a bag form with inlet and outlet ports.

7. A container according to any one of claims 1 to 3, wherein the container is vacuum-formed or pressure-formed.

* * * * *